(12) United States Patent
Cheng et al.

(10) Patent No.: US 10,067,576 B2
(45) Date of Patent: Sep. 4, 2018

(54) HANDHELD POINTER DEVICE AND TILT ANGLE ADJUSTMENT METHOD THEREOF

(71) Applicant: PIXART IMAGING INC., Hsin-Chu (TW)

(72) Inventors: Han-Ping Cheng, Hsin-Chu (TW); Chao-Chien Huang, Hsin-Chu (TW); Chia-Cheun Liang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 163 days.

(21) Appl. No.: 14/273,523

(22) Filed: May 8, 2014

(65) Prior Publication Data

US 2014/0247214 A1    Sep. 4, 2014

Related U.S. Application Data

(63) Continuation-in-part of application No. 13/771,072, filed on Feb. 19, 2013.

(30) Foreign Application Priority Data

May 22, 2013  (TW) .............................. 102118058 A

(51) Int. Cl.
*G06F 3/033*    (2013.01)
*G06F 3/01*     (2006.01)
(Continued)

(52) U.S. Cl.
CPC .............. *G06F 3/033* (2013.01); *G06F 3/017* (2013.01); *G06F 3/0304* (2013.01); *G06F 3/0346* (2013.01)

(58) Field of Classification Search
None
See application file for complete search history.

(56) References Cited

U.S. PATENT DOCUMENTS 5,424,756 A  *  6/1995  Ho ........................ G06F 1/1616
                                                        345/158
6,411,278 B1     6/2002  Kage et al.
(Continued)

FOREIGN PATENT DOCUMENTS

CN      101388138 A     3/2009
CN      101398721 A     4/2009
(Continued)

*Primary Examiner* — Alexander Eisen
*Assistant Examiner* — Kebede Teshome
(74) *Attorney, Agent, or Firm* — Li & Cai Intellectual Property (USA) Office

(57) ABSTRACT

An exemplary embodiment of the present disclosure provides a handheld pointer device and a tilt angle adjustment method thereof. The tilt angle adjustment method includes the following steps. Images corresponding to the position of a reference point are captured as the handheld pointer device pointing toward the reference point to generate a plurality of frames. Whether the reference point has substantially moved is subsequently determined based on the plurality of frames. When determines that the reference point has not substantially moved, causes an accelerometer unit of the handheld pointer device to detect the accelerations thereof over various axes so as to update a first tilt angle being used currently to a second tilt angle, accordingly. The handheld pointer device may thus accurately and efficiently calculate the relative position of the reference point with the appropriate tilt angle of the handheld pointer device used.

24 Claims, 10 Drawing Sheets

(51) Int. Cl.
*G06F 3/03* (2006.01)
*G06F 3/0346* (2013.01)

(56) References Cited

U.S. PATENT DOCUMENTS

| | | |
|---|---|---|
| 7,942,745 B2 | 5/2011 | Ikeda et al. |
| 8,010,313 B2 | 8/2011 | Mathews et al. |
| 2007/0211027 A1 | 9/2007 | Ohta |
| 2007/0236451 A1 | 10/2007 | Ofek et al. |
| 2008/0122788 A1 | 5/2008 | Sirtori |
| 2008/0180396 A1* | 7/2008 | Lin .................... G06F 3/03542 345/158 |
| 2008/0204406 A1 | 8/2008 | Ueno |
| 2009/0009469 A1 | 1/2009 | Hsu et al. |
| 2009/0066646 A1 | 3/2009 | Choi et al. |
| 2010/0182235 A1* | 7/2010 | Niikura .................... G06F 3/02 345/158 |
| 2010/0259477 A1 | 10/2010 | Kabasawa et al. |
| 2011/0298710 A1 | 12/2011 | Ruckhaeberle et al. |
| 2013/0021246 A1* | 1/2013 | Choi ........................ G06F 3/033 345/158 |
| 2013/0093675 A1* | 4/2013 | Lin ........................ G06F 3/033 345/158 |
| 2013/0328772 A1 | 12/2013 | Cheng et al. |

FOREIGN PATENT DOCUMENTS

| | | |
|---|---|---|
| TW | 200928897 | 7/2009 |
| TW | 201305854 A1 | 2/2013 |

* cited by examiner

HANDHELD POINTER DEVICE AND TILT ANGLE ADJUSTMENT METHOD THEREOF

This U.S. Non-provisional Application is a continuation-in-Part of application Ser. No. 13/771,072, filed Feb. 19, 2013, now status pending, and entitled "Hand-Held Pointing Device". This U.S. Non-provisional also claims the priority to Taiwan patent application Ser. No. TW 102118058, filed May 22, 2013, entitled "Handheld Pointer Device And Tilt Angle Adjustment Method Thereof". The entire specification of which is hereby incorporated by reference in its entirety for all purposes.

BACKGROUND

1. Technical Field

The present disclosure relates to a pointer device and an adjustment method thereof, in particular, to a handheld pointer device and a tilt angle adjustment method thereof.

2. Description of Related Art

A handheld pointer device is operable to compute optical coordinates through analyzing the image position of at least a reference mark in an image captured and can be utilized for transmitting optical coordinates computed to a video game console and assisting gaming process executed on the video game console. Currently, handheld pointer devices have been widely used in many types of interactive gaming systems such as light gun games, baseball games, tennis games, and the like.

It is known in the art the that the distance between an image sensor installed on a handheld pointer device and a display apparatus and the rotation angle of the image sensor while capturing images affect the calculation of pointing coordinates thereafter. Hence, when a handheld pointer device does not have sensor or related apparatus installed thereon for detecting the rotation angle of the handheld pointer device, discrepancy might arise in the computation of the relative movement of the handheld pointer device with respect to the position of the reference point whenever the image sensor on the handheld pointer device is tilted, which causes the handheld pointer device to inaccurately determining the relative position thereof with respect to the reference point.

Currently, to resolve the described issue of erroneous determination in the relative position, industries typically either adopt two or more reference points for a handheld pointer device to use as reference or install an accelerometer and a gyroscope on the handheld pointer device concurrently for the determination of the tilt angle associated with the image sensor of the handheld pointer device, However, using more than two reference points not only might increase the complexity in computing relative displacement, the image sensor of the handheld pointer device also must configured to be able to have view angle widely enough to detect reference points. Similarly, using both the accelerometer and the gyroscope increases not only in the manufacturing cost, but also in the power consumption of the handheld pointer device.

SUMMARY

Accordingly, an exemplary embodiment of the present disclosure provides a handheld pointer device and a tilt angle adjustment method thereof. The tilt angle adjustment method enhances the accuracy in the computation of the relative position of the handheld pointer device relative to the reference point by automatically calibrating the tilt angle of the handheld pointer device.

An exemplary embodiment of the present disclosure provides a tilt angle adjustment method of the handheld pointer device, and the tilt angle adjustment method includes the following steps. Images corresponding to the position of a reference point are captured as the handheld pointer device pointing toward the reference point to generate a plurality of frames. Next, whether or not the reference point has substantially moved is subsequently determined according to the frames. When determined that the reference point has not substantially moved, an accelerometer unit of the handheld pointer device is operatively driven to detect a plurality of accelerations of the handheld pointer device over multiple axes and update a first tilt angle currently used to a second tilt angle calculated according to the accelerations of the point device detected.

Another exemplary embodiment of the present disclosure provides a tilt angle adjustment method of the handheld pointer device, the tilt angle adjustment method includes the following steps. Images corresponding to the position of a reference point are captured as the handheld pointer device pointing toward the reference point to generate a plurality of frames. An acceleration of the reference point is calculated based on the images positions of the reference point in three consecutive frames. Whether or not the acceleration of the reference point is equal to zero is subsequently determined. An accelerometer unit of the handheld pointer device is operatively driven to detect a plurality of accelerations of the handheld pointer device over multiple axes to update a first tilt angle currently used to a second tilt angle calculated according to the accelerations of point device detected upon determined that the acceleration of the reference point is zero.

An exemplary embodiment of the present disclosure provides a handheld pointer device, which includes an image capturing unit, an accelerometer unit, and a processing unit. The image capturing unit is configured to capture a plurality of images corresponding to the position of a reference point and sequentially generates a plurality of frames. The accelerometer unit is configured to detect accelerations of the handheld pointer device over multiple axes for generating an acceleration vector. The processing unit is coupled to the image capturing unit and the accelerometer unit. The processing unit is configured to operatively determine whether or not the reference point has substantially moved according to the frames. When the processing unit determines that the reference point has not substantially moved, the processing unit operatively causes the accelerometer unit to detect the accelerations of the handheld pointer device over multiple axes and correspondingly updates a first tilt angle currently used to a second tilt angle calculated according to the accelerations of the handheld pointer device.

An exemplary embodiment of the present disclosure, the present disclosure provides a handheld pointer device, and the handheld pointer device includes an image capturing unit, an accelerometer unit, and a processing unit. The image capturing unit is configured to capture a plurality of images corresponding to the position of a reference point and sequentially generates a plurality of frames. The accelerometer unit is configured to detect accelerations of the handheld pointer device over multiple axes for generating an acceleration vector. The processing unit is coupled to the image capturing unit and the accelerometer unit. The processing unit is configured for operatively calculating an acceleration of the reference point based on the image positions of the reference point in three consecutive frames. When the processing unit determined that the acceleration of the reference point is zero, the processing unit causes the accelerometer unit to detect the accelerations of the handheld pointer device over multiple axes and correspondingly updates a first tilt angle currently used to a second tilt angle calculated according to the accelerations of the handheld pointer device.

To sum up, the present disclosure provides a handheld pointer device and a tilt angle adjustment method thereof, which can operatively determine whether to update the tilt angle of the handheld pointer device through determining whether or not the reference point detected has moved. Particularly, the handheld pointer device can determine whether or not the reference point detected has substantially moved according to the velocity of the reference point, the acceleration of the reference point, and/or the accelerations of the handheld pointer device. Accordingly, the handheld pointer device of present disclosure is operable to accurately calculate the relative position of the reference point accurately without having to install the gyroscope or using more than two reference points as references. Thus, the overall hardware architecture of the handheld pointer device and the calculation complexity can be simplified. Thereby, reduces the associated manufacturing and design cost of the handheld pointer device.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIGS. 8-1 and 8-2 are flowchart diagrams illustrating a tilt angle adjustment method of a handheld pointer device provided in accordance to another embodiment of the present disclosure.

DESCRIPTION OF THE EXEMPLARY EMBODIMENTS

Figure 1:
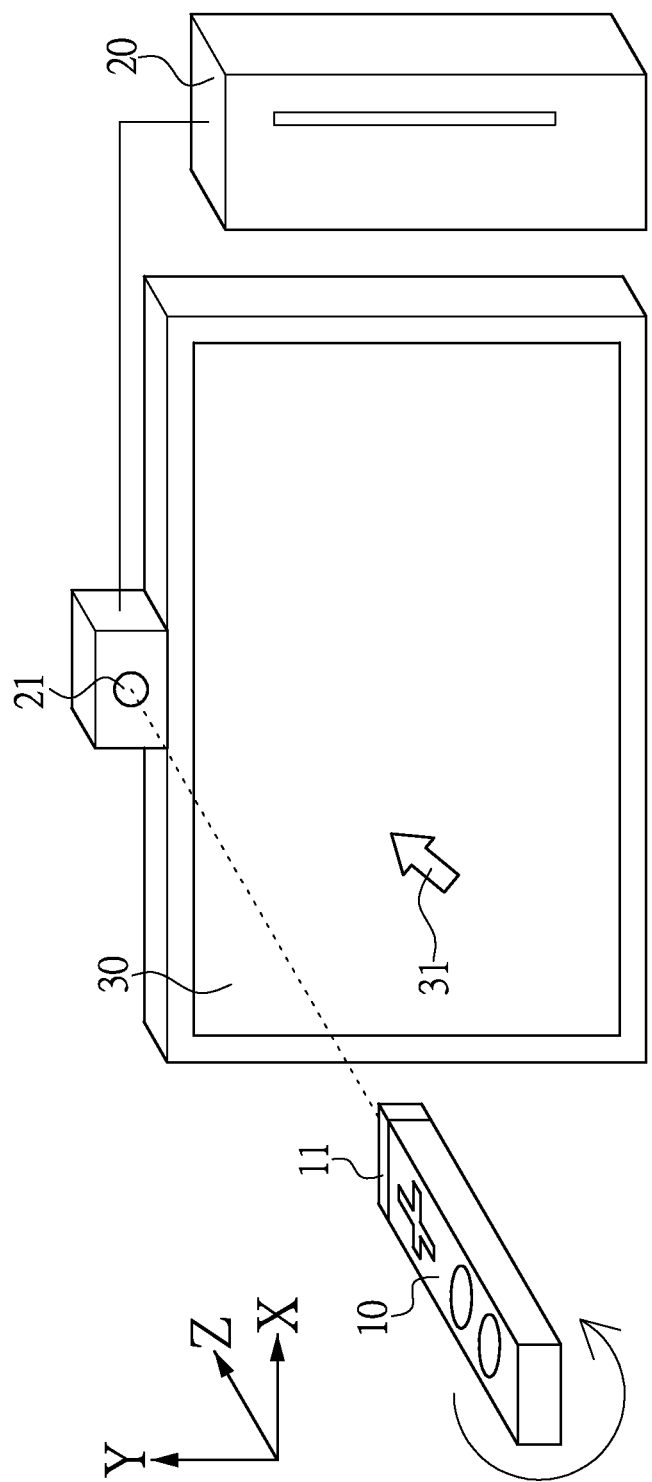
FIG. 1 is a schematic diagram of an interactive system provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

[An Exemplary Embodiment of a Handheld Pointer Device]

The handheld pointer device of the present disclosure can be used for positioning a pointer displayed on an image display apparatus (not shown in figure). Referring to FIG. 1, which shows a schematic diagram illustrating an interactive system provided in accordance to an exemplary embodiment of the present disclosure. The interactive system includes a handheld pointer device 10, a host computer 20, and an image display apparatus 30. The host computer 20 is operable to process the data to execute a software program, such as an interactive game program, to generate interactive images showing the execution progress of the software program on the image display apparatus 30 for a user to view and operate. The host computer 20 further provides a reference point 21 for the handheld pointer device 10 to capture images corresponding to the reference point 21 and control the movement of a cursor 31 displayed on the image display apparatus 30 according to the image of the reference point 21.

It is worth noting that in the present embodiment, the host computer 20 can be a game host or a computer system. The image display apparatus 30 can include but not limited to a projection display, a game console display, a screen of a television, or a display screen of a computer system. The software program described herein can be stored as program code in a compact disk, a flash disk, or other equivalent memory device. The reference point 21 can be implemented by a plurality of light emitting diodes with specific wavelength, such as infrared light emitting diodes, laser diodes, or ultraviolet light emitting diodes, arranged in a regular or irregular shape. In addition, the light emitting diode can be configured to electrically connect to the host computer 20 or can be powered by an independent power source for lighting. Moreover, the number of the reference point is not limited to one as used in the instant embodiment. Those skilled in the arts shall be able to configure the exact number of the reference point 21 needed to be one, two, or more than two according to the practical design and/or operational requirements. In other words, FIG. 1 is only used to illustrate an operation of the handheld pointer device 10, and the instant disclosure is not limited thereto.

Briefly, the handheld pointer device 10 can determine whether to update a tilt angle currently used i.e., the rotation angle of the handheld pointer device 10 according to the image of the reference point 21 captured. The handheld pointer device 10 can accurately calculate the movement information of the reference point 21 relative to the handheld pointer device 10 according to the image position of the reference point 21 and the rotation angle of the handheld pointer device 10. The handheld pointer device 10 can wirelessly transmit the movement information of the reference point 21 relative to the handheld pointer device 10 to the host computer 20 to control the operation of the cursor 31 in coordination with the execution of the software program. The handheld pointer device 10 can selectively update or continue to use the rotation angle currently used in calculating the position of the reference point 21 for accurately calculating the movement information of the reference point 21 relative to the handheld pointer device 10.

More specifically, the handheld pointer device 10 captures images of the reference point 21 as the handheld pointer device 10 points toward the position of the reference point 21 and sequentially generates a plurality of frames containing the image of the reference point 21. Next, the handheld pointer device 10 determines whether or not the image positions of the reference point 21 formed in the frames has substantially moved according to the frames generated so as to determine whether to update the tilt angle currently used in calculating the relative position of the handheld pointer device 10. In other words, the handheld pointer device 10 operatively determines whether or not the image positions of the reference point 21 formed in the frames has substantially moved to determine whether or not the handheld pointer device 10 is in motion or at rest to determine whether to update the tilt angle of the handheld pointer device 10 currently used in calculating the relative position of the handheld pointer device 10.

In the instant embodiment, the reference point 21 has substantially moved herein indicates that the reference point 21 has moved over a short period of time (i.e., a second, a millisecond, two adjacent frames, or multiple frames). Whether the reference point 21 has substantially moved can be determined based on the displacement, the velocity or the acceleration of the image positions associated with the reference point 21 formed in the frames. To put it concretely, when the position displacement of the image position of the reference point 21 formed in the frames is determined to be greater than a predefined displacement threshold, or when the velocity of the image position of the reference point 21 formed in the frames is determined to be greater than a predefined velocity threshold, or when the acceleration of the image position of the reference point 21 formed in the frames is determined to be greater than a predefined acceleration threshold, the handheld pointer device 10 determines that the reference point 21 has substantially moved. When the handheld pointer device 10 determines that the reference point 21 has substantially moved, the handheld pointer device 10 does not update the tilt angle currently used by the handheld pointer device 10 for calculating the relative position of the handheld pointer device 10.

When the handheld pointer device 10 determines that the reference point 21 has not substantially moved (i.e., the displacement of the image position of the reference point 21 formed in the frames is determined to be less than the predefined displacement threshold, or the velocity of the image position of the reference point 21 formed in the frames is determined to be less than the predefined velocity threshold, or the acceleration of the image position of the reference point 21 formed in the frames is less determined to be than the predefined acceleration threshold), the handheld pointer device 10 calculates the displacement of the handheld pointer device 10 relative to the reference point 21 with a newly detected tilt angle and correspondingly controls the movement of the cursor 31 displayed on the image display apparatus 30 in coordination with the execution of the software program on the host computer 20.

In one embodiment, the handheld pointer device 10 can use an inertial sensor to sense and calculate the instant tilt angle of the handheld pointer device 10. However, the force exerted by the user onto the handheld pointer device 10 while operating the handheld pointer device 10, might affect the gravitational direction determination result determined by the inertial sensor. Hence, the impact of the user on the handheld pointer device 10 while operating must be removed or eliminated in order to accurately calculate and update the tilt angle of the handheld pointer device 10.

When determined that the handheld pointer device 10 being operated by the user has not substantially moved (i.e., that the reference point 21 detected has not substantially moved), the handheld pointer device 10 can be regarded as unaffected by the external force exerted thereon. Moreover, as the handheld pointer device 10 uses an image sensor equipped thereon to detect the pointing position of the handheld pointer device 10, thus, when the handheld pointer device 10 has substantially moved, the image positions of the reference point 21 formed in the frames captured by the image sensor would at same time changes. Hence, the handheld pointer device 10 can determine whether or not the handheld pointer device 10 has substantially moved based on the image positions of the reference point 21 formed in the frames captured and generated by the image sensor.

Figure 2:
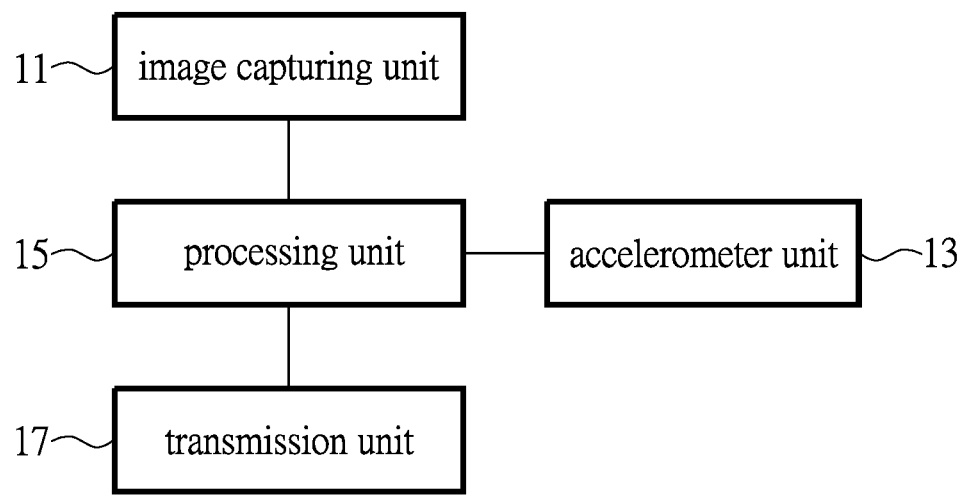
FIG. 2 is a block diagram of a handheld pointer device provided in accordance to an exemplary embodiment of the present disclosure.

More specifically, please refer to FIG. 2 in conjunction with FIG. 1, wherein FIG. 2 shows a block diagram illustrating a handheld pointer device provided in accordance to an exemplary embodiment of the present disclosure. The handheld pointer device 10 includes an image capturing unit 11, an accelerometer unit 13, a processing unit 15, and a transmission unit 17. The image capturing unit 11, the accelerometer unit 13, and the transmission unit 17 are coupled to the processing unit 15, respectively The image capturing unit 11 is configured to operatively capture images corresponding to the position of the reference point 21 and sequentially generate a plurality of frames. Specifically, the image capturing unit 11 can further has an optical filter (not shown) installed for filtering out light spectrum outside the specific light spectrum generated by the reference point 21 such that that the image capturing unit 11 only detects the light having wavelength within the specific light spectrum generated by the reference point 21. The image capturing unit 11 can be configured to operatively detect the light emitted from the reference point 21 according to a predetermined image capturing frequency (for example, 200 frames per second), and sequentially generates the plurality of frames containing the image of the reference point 21.

In the present embodiment, the image capturing unit 11 can be implemented by a charge-coupled device (CCD) image sensor or a complementary metal oxide semiconductor (CMOS) image sensor. Those skilled in the art shall be able to design and implement the image capturing unit 11 based on the practical operational requirements.

The accelerometer unit 13 is configured to detect a plurality of accelerations of the handheld pointer device 10 over multiple axes (e.g., X-axis, Y-axis, and Z-axis) of a space, and generate an acceleration vector. The accelerometer unit 13 in the instant embodiment can be a G-sensor or an accelerometer and can be built-in in the handheld pointer device 10 and the present disclosure is not limited thereto. Those skilled in the art shall be able to implement the accelerometer unit 13 according to the practical operational and/or design requirement.

The processing unit 15 operatively determines whether or not the reference point 21 has substantially moved according to the frames. When the processing unit 15 determines that the reference point 21 has not substantially moved, the processing unit 15 drives the accelerometer unit 13 to detect the accelerations of the handheld pointer device 10 over multiple axes and updates a first tilt angle currently used to a second tilt angle calculated according to the accelerations of the handheld pointer device 10 detected. The processing unit 15 then uses the second tilt angle to calculate the image position of the reference point in one of the frames i.e., the motion vector of the reference point 21.

In one embodiment, the processing unit 15 can calculate the instant tilt angle of the handheld pointer device 10 using the accelerations of the handheld pointer device 10 over X-axis, Y-axis, and Z-axis detected by the accelerometer 13 and the included angles calculated between any two axes. The processing unit 15 further calculates the image position of the reference point 21 formed in one of the frames with the second tilt angle calculated.

When the processing unit 15 determines that the reference point 21 has substantially moved, the processing unit 15 operatively determines that the accelerometer 13 is currently unable to accurately measure and calculate the tilt angle of the handheld pointer device 10 and therefore the processing unit 15 does not update the first tilt angle currently used. The processing unit 15 continues to use the first tilt angle to calculate the image position of the reference point 21 formed in the frames. The processing unit 15 further wirelessly transmits the relative movement information of the reference point 21 to the host computer 20 via the transmission unit 17, so as to control the movement of the cursor 31 shown on the image display apparatus 30 in coordination with the execution of the software program on the host computer 20.

The algorithm used by the processing unit 15 for calculating the tilt angle (i.e., the first tilt angle, and the second tile angle) of the handheld pointer device 10 is briefly described in the following paragraphs.

In one embodiment, the plurality frames generated by the image capturing unit 11 is rectangular. The long side of a frame is configured to parallel to the X-axis, while the short side of the frame is configured to parallel to the Y-axis. When the processing unit 15 determines that the reference point 21 has not moved, the processing unit 15 can cause the accelerometer unit 13 to detect the accelerations Vx, Vy, and Vz of the handheld pointer device 10 over the X-axis, Y-axis, and Z-axis of the three dimensional space depicted in FIG. 1. The accelerometer unit 13 can operatively generate acceleration vector $\overline{V}$ according to the detection result to generate an acceleration sensing signal. The acceleration sensing signal may represent the ratio of any two accelerations, such as the ratio of the acceleration Vx to the acceleration Vy. The processing unit 15 calculates the tilt angle of the handheld pointer device 10 currently used according to the acceleration sensing signal received.

Specifically, the processing unit 15 can calculate the acceleration vector $\overline{V}$ and the included angles between any two of axes by using the following equations (1) to (3) and generate the tilt angle of the handheld pointer device 10, $$\sin\theta_x = \frac{|Vx|}{|gxy|} \quad (1)$$

$$\cos\theta_y = \frac{|Vy|}{|gxy|} \quad (2)$$

$$|gxy| = \sqrt{Vx^2 + Vy^2} \quad (3)$$

wherein Vx represents the acceleration of the handheld pointer device 10 over the X-axis detected by the accelerometer unit 13; Vy represents the acceleration of the handheld pointer device 10 over the Y-axis detected by the accelerometer unit 13; |gxy| represents the gravitational acceleration calculated according to the acceleration Vx and the acceleration Vy; wherein included angles between Vz and Vx, and between Vz and Vy are omitted while included angle between Vx and Vy is enough for tilt angle calculation.

The processing unit 15 subsequently calibrates the orientation of the frames based on the calculation result of the equations (1) and the equations (2) so as to calculate the image position of the reference point 21 in one of the frames. The processing unit 15 can use the equation (4) to calibrate the orientation of the frames, $$\begin{bmatrix} x' \\ y' \end{bmatrix} = \begin{bmatrix} \cos(\theta) & -\sin(\theta) \\ \sin(\theta) & \cos(\theta) \end{bmatrix} \begin{bmatrix} x \\ y \end{bmatrix} \quad (4)$$

wherein x represents the X-axis coordinate of the image position of the reference point 21 formed in one of the frames; y represents the Y-axis coordinate of the image position of the reference point 21 formed in one of the frames; x' represents the X-axis coordinate of the image position of the reference point 21 in one of the frames after calibration; y' represents the adjusted Y-axis coordinate of the image position of the reference point 21 in one of the frames after calibration. The processing unit 15 can calculate the pointing coordinate or the movement information of the handheld pointer device 10 relative to the reference point 21 or the image display apparatus 30 according to X-axis coordinate x' and Y-axis coordinate y' obtained after calibration.

Next, the processing unit 15 can wirelessly transmit the pointing coordinate or the movement information of the handheld pointer device 10 relative to the reference point 21 or the image display apparatus 30 to the host computer 20 via the transmission unit 17 to correspondingly control the movement of the cursor 31 shown on the image display apparatus 30.

It worth noting that those skilled in the art should understand that the accelerometer unit 13 of the handheld pointer device 10 in the present disclosure can also be configured to only detect accelerations over two dimensions, such as the acceleration Vx and the acceleration Vy. The above described acceleration determination method for the handheld pointer device 10 is only an implementation and the present disclosure is not limited thereto.

Moreover, the processing unit 15 in the present embodiment can be implemented by a processing chip such as a microcontroller or an embedded controller, programmed with necessary program code, and the present disclosure is not limited thereto. The transmission unit 17 may be configured to utilize Bluetooth technology to transmit the movement information to the host computer 20, and the present invention is not limited thereto.

It shall be noted that the exact type of exact structure and/or the implementation method associated with the image capturing unit 11, the accelerometer unit 13, the processing unit 15, and the transmission unit 17 may depend upon the exact type, the exact structure, and/or the implementation method of the handheld pointer device 10 and is not limited the examples provided in the instant embodiment.

Figure 3:
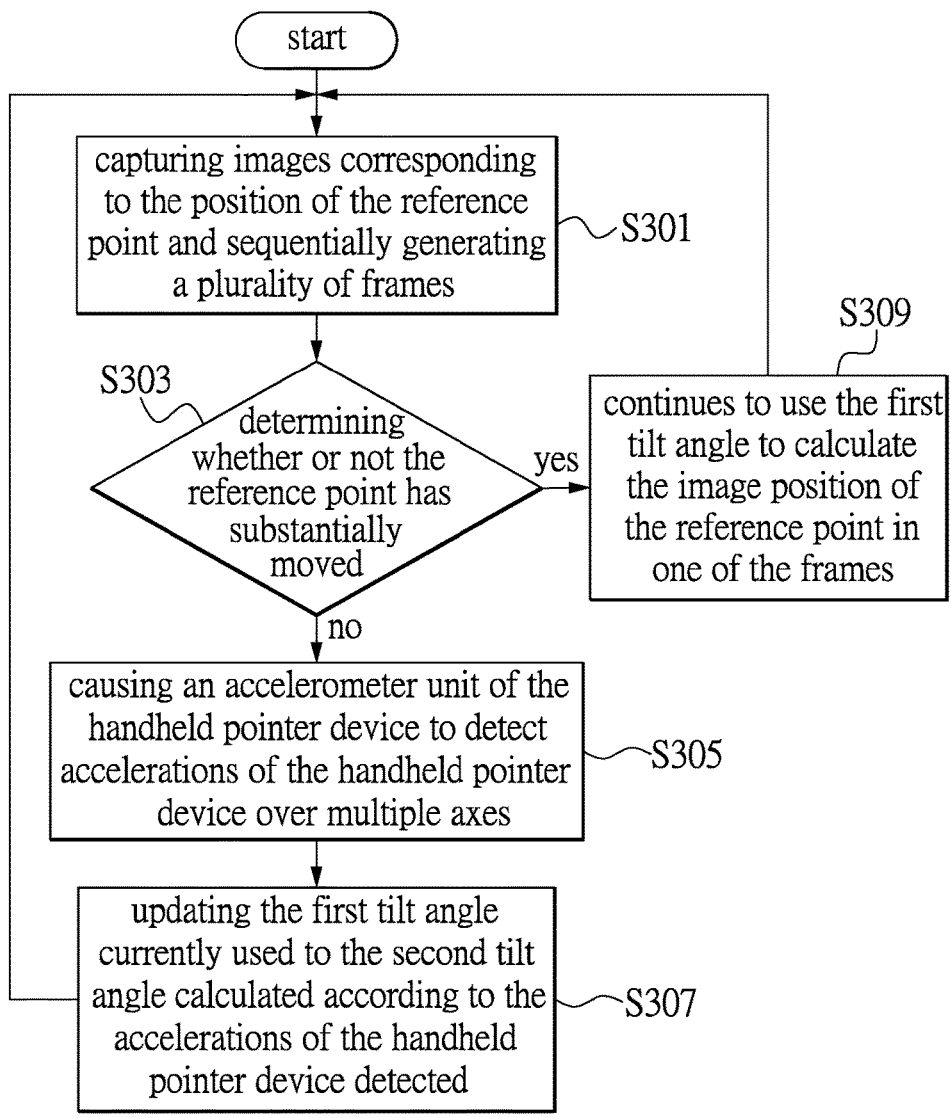
FIG. 3 is a flowchart diagram illustrating a tilt angle adjustment method of a handheld pointer device provided in accordance to an exemplary embodiment of the present disclosure.

The present embodiment further provides a tilt angle adjustment method of the handheld pointer device 10 for further illustrate the operation of the handheld pointer device 10. Please refer to FIG. 3 in conjunction with FIG. 1 and FIG. 2. FIG. 3 shows a flowchart diagram illustrating a tilt angle adjustment method for the handheld pointer device provided in accordance to an exemplary embodiment of the present disclosure.

In Step S301, the image capturing unit 11 of the handheld pointer device 10 is driven to capture images corresponding to the position of the reference point 21 according to the image capturing frequency (e.g., 200 frames per second) as the handheld pointer device 10 points toward the reference point 21 and sequentially generates plurality of frames.

In Step S303, the processing unit 15 of the handheld pointer device 10 determines whether or not the reference point 21 has substantially moved according to the frames. For instance, the processing unit 15 can determine whether the reference point 21 has substantially moved or not by analyzing the movement (e.g., the displacement, the velocity, and/or the acceleration) of the image position corresponding to the reference point 21 in multiple consecutive frames.

When the processing unit 15 of the handheld pointer device 10 determines that the reference point 21 has not substantially moved (i.e., the handheld pointer device 10 is in at rest), the processing unit 15 executes Step S305. On the other hand, when the processing unit 15 of the handheld pointer device 10 determines that the reference point 21 has substantially moved (i.e., the handheld pointer device 10 is in motion the processing unit 15 executes Step S309.

In Step S305, the processing unit 15 drives the accelerometer unit 13 of the handheld pointer device 10 to detect accelerations of the handheld pointer device 10 over multiple axes (i.e., the X-axis, the Y-axis, and the Z-axis). Next, in Step S307, the processing unit 15 updates the first tilt angle currently used to the second tilt angle according to the accelerations detected. The second tilt angle is the instant tilt angle of the handheld pointer device 10 and is calculated by the processing unit 15 using equations (1) to (3) with the accelerations detected.

In Step S309, the processing unit 15 does not update the first tilt angle of the handheld pointer device 10 as the processing unit 15 determined that the reference point 21 has substantially moved, indicating that the handheld pointer device 10 is in motion. The processing unit 15 calculates the image position of the reference point 21 formed in one of the frames according to the first tilt angle and the frames captured.

Next, the processing unit 15 wirelessly transmits a position vector associated with the reference point 21 in one of the frames to the host computer 20 using the transmission unit 17 to control the movement of the cursor 31 in the image display apparatus 30 correspondingly.

Moreover, after the execution of Step S307 or Step S309, the processing unit 15 returns to Step S301 and executes steps of capturing another image containing the reference point 21 and determining whether the reference point 21 has substantially moved, to determine whether to update the first tilt angle of the handheld pointer device 10.

As previously described, the processing unit 15 can determine whether or not the reference point 21 has substantially moved or not according to the continuous movement of image positions of the reference point 21 in the frames. Details on the operation of processing unit 15 in determining whether the reference point 21 has moved or not are provided in the following paragraph.

In one embodiment, the processing unit 15 can determine whether or not the reference point 21 has substantially moved by calculating the velocity of the reference point 21. Please refer to FIG. 4 in conjunction with FIGS. 1, 2, 6A, and 6B, FIG. 4 shows a flowchart diagram illustrating a method for determining whether the reference point has substantially moved provided in accordance to an exemplary embodiment of the present disclosure. The steps shown in FIG. 4 can be executed in the execution of Step S303 shown in FIG. 3.

In Step S401, the processing unit 15 calculates the velocity of the reference point 21 according to the image positions of the reference point 21 respectively formed in the first frame f1 and the second frame f2 among the frames captured. The first frame f1 and the second frame f2 are two consecutive frames captured and generated by the image capturing unit 11. The capturing time of the second frame f2 is later than the capturing time of the first frames f1. The image position of the reference point 21 formed in the first frame f1 is represented by a reference point image 61, and the image position of the reference point 21 formed in the second frame f2 is represented by a reference point image 61'.

The processing unit 15 can calculate the velocity of the reference point 21 using equation (5):

$$v = \left| \frac{(\overline{p_2} - \overline{p_1})}{(t_{f2} - t_{f1})} \right| \tag{5}$$

wherein v represents the velocity of the reference point 21; $\overline{p_1}$ represents the image position vector of the reference point 21 formed in the first frame f1, and $\overline{p_1}$ is (x1,y1); $\overline{p_2}$ represents the image position vector of the reference point 21 formed in the second frame f2, and $\overline{p_2}$ is (x2,y2); $t_{f1}$ represents the capturing time of the first frame f1; $t_{f2}$ represents the capturing time of the second frame f2. The processing unit 15 configures the center (i.e., the center mark "X" in the first frame f1 and the second frame f2) of the sensing array of the image capturing unit 11 as an origin and calculates the position of the reference point image 61 associated with the image position of the reference point 21 formed in the first frame f1 (i.e., $\overline{p_1}$) and the position of the reference point image 61' associated with the image position of the reference point 21 formed in the second frame f2 (i.e., $\overline{p_2}$) shown in FIGS. 6A and 6B, therefrom.

In Steps S403, the processing unit 15 determines whether or not the velocity v is greater than the predefined velocity threshold (e.g., 1 pixel per unit time). The unit time herein can be defined based on the image capturing frequency of the image capturing unit 11 (e.g., the unit time may be the time interval between two consecutive frames calculated according to the image capturing frequency), or the number of the consecutive frames analyzed (e.g., per every two consecutive frames).

When the processing unit 15 of the handheld pointer device 10 determines that the velocity v is less than the predefined velocity threshold, the processing unit 15 executes Step S405; otherwise, the processing unit 15 executes Step S407. The predefined velocity threshold can be pre-configured in the processing unit 15 via firmware design according to the practical application requirement.

In Step S405, the processing unit 15 determines that the reference point 21 has not substantially moved between the first frame f1 to the second frame f2. In Step S407, the processing unit 15 determines that the reference point 21 has substantially moved between the first frame f1 to the second frame f2, and does not update the first tilt angle currently used by the handheld pointer device 10.

For example, when the velocity v calculated by the processing unit 15 for the two consecutive frames (i.e., the first frame f1 and the second frame f2) is greater than one pixel per unit time, the processing unit 15 determines that the reference point 21 has substantially moved between the first frame f1 to the second frame f2. On the other hand, when the velocity v calculated is less than one pixel per unit time, the processing unit 15 determines that the reference point 21 has not substantially moved between the first frame f1 and the second frame f2.

In another embodiment, the processing unit 15 can determine whether or not the reference point 21 has substantially moved by detecting displacement of the reference point 21. Please refer to FIG. 1, FIG. 2, FIG. 6A, and FIG. 6B, the processing unit 15 can calculate the displacement between the image positions of the reference point 21 formed in the first frame f1 and the second frame f2 (i.e., $\overline{p_2}-\overline{p_1}$). The processing unit 15 can determine whether the displacement calculated is less than the predefined displacement threshold (e.g., 5 pixels per unit time) to determine whether the reference point 21 has substantially moved.

When the processing unit 15 of the handheld pointer device 10 determines that the displacement is less than the predefined displacement threshold (e.g., 5 pixels per unit time), the processing unit 15 determines that the reference point 21 has not substantially moved; otherwise, the processing unit 15 determines that the reference point 21 has substantially moved, and does not update the first tilt angle currently used by the handheld pointer device 10.

For example, when the displacement calculated by the processing unit 15 between the two consecutive frames (i.e., the first frame f1 and the second frame f2) is greater than 5 pixels, the processing unit 15 determines that the reference point 21 has substantially moved between the first frame f1 and second frame f2. On the other hand, when the displacement calculated by the processing unit 15 is less than 5 pixels, the processing unit 15 determines that the reference point 21 has substantially moved between the first frame f1 and the second frame f2.

The predefined displacement threshold can be pre-configured in the processing unit 15 via firmware design according to the practical application requirement.

Figure 5:
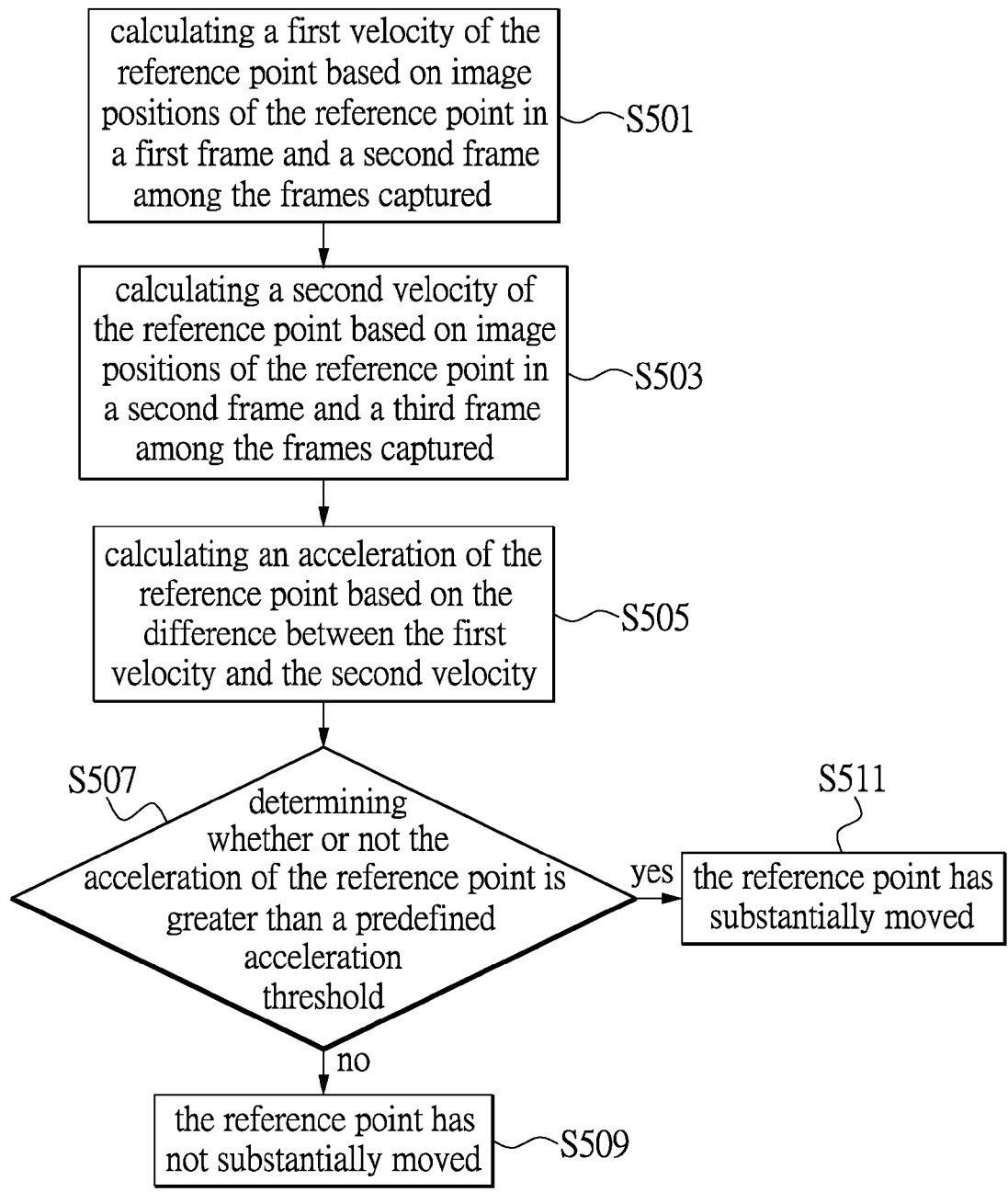
FIG. 5 is a flowchart diagram illustrating another method for determining whether the reference point has substantially moved provided in accordance to another exemplary embodiment of the present disclosure.

In another embodiment, the processing unit 15 can determine whether or not the reference point 21 has substantially moved by calculating the acceleration of the reference point 21. Please refer to FIG. 5 in conjunction with FIG. 1, FIG. 2, FIG. 6A, FIG. 6B, and FIG. 6C, wherein FIG. 5 shows a flowchart diagram illustrating another method for determining whether the reference point has substantially moved provided in accordance with another exemplary embodiment of the present disclosure. Steps shown in FIG. 5 can be executed in the execution of Step S303 shown in FIG. 3. In particular, steps shown in FIG. 5 can be executed after the handheld pointer device 10 has determined whether the reference point 21 has substantially moved or not according to the velocity of the reference point 21 computed.

In Step S501, the processing unit 15 calculates the acceleration of the reference point 21 according to the first frame f1, the second frame f2, and the third frame f3 among the frames generated by the image capturing unit 11. The first frame f1, the second frame f2, and the third frame f3 are three consecutive frames generated by the image capturing unit 11. The capturing time of the second frame f2 is later than the capturing time of the first frame f1. The capturing time of the third frame f3 is later than the capturing time of the second frame f2.

In Steps S503 and S505, the processing unit 15 can use equation (5) to calculate the velocity of the reference point 21 between the first frame f1 and the second frame f2 and the velocity of the reference point 21 between the second frame f2 and the third frame f3, respectively. The image position of the reference point 21 in the first frame f1 is represented by a reference point image 61. The image position of the reference point 21 in the second frame f2 is represented by a reference point image 61'. The image position of the reference point 21 in the third frame f3 is represented by a reference point image 61".

The processing unit 15 can use equations (6) and (7) to calculate the first velocity of the reference point 21 between the first frame f1 and the second frame f2, and the second velocity of the reference point 21 between the second frame f2 and the third frame f3. The first velocity is calculated using the equation (6):

$$v_1 = \left| \frac{(\overline{p_2} - \overline{p_1})}{(t_{f2} - t_{f1})} \right| \qquad (6)$$

wherein, $v_1$ represents the first velocity; $\overline{p_1}$ represents the image position of the reference point 21 formed in the first frame f1, and $\overline{p_1}$ is (x1,y1); $\overline{p_2}$ represents the image position of the reference point 21 formed in the second frame f2, and $\overline{p_2}$ is (x2,y2); $t_{f1}$ represents the capturing time of the first frame f1; $t_{f2}$ represents the capturing time of the second frame f2. The second velocity is calculated by using equation (7):

$$v_2 = \left| \frac{(\overline{p_3} - \overline{p_2})}{(t_{f3} - t_{f2})} \right| \qquad (7)$$

wherein, $v_2$ represents the second velocity; $\overline{p_2}$ represents the image position of the reference point 21 formed in the second frame f2; $\overline{p_3}$ represents the image position of the reference point 21 formed in the third frame f3; $t_{f2}$ represents the capturing time of the second frame f2; $t_{f3}$ represents the capturing time of the third frame f3. As previously described, the processing unit 15 configures the center (i.e., the center mark "X" in the first frame f1, the second frame f2, and the third frame f3) of the sensing array of the image capturing unit 11 as an origin and calculates the position of the reference point image 61 associated with the image position of the reference point 21 in the first frame f1 (i.e., $\overline{p_1}$), the position of the reference point image 61' associated with the image position of the reference point 21 in the second frame f2 (i.e., $\overline{p_2}$), and the position of the reference point image 61" associated with the image position of the reference point 21 in the third frame f3 (i.e., $\overline{p_3}$) therefrom.

In Step S505, the processing unit 15 calculates the accelerations of the reference point 21 according to the image position of the reference point 21 formed in the first frame f1, the second frame f2, and the third frame f3 (i.e., reference point image 61, 61', and 61"). Specifically, the processing unit 15 can obtain the acceleration of the reference point 21 by calculating the velocity difference between the first velocity $v_1$ and the second velocity $v_2$.

Next, in Step S507, the processing unit 15 determines whether or not the acceleration calculated is greater than the predefined acceleration threshold (e.g., 0 g). When the processing unit 15 determines that the acceleration is less than the predefined acceleration threshold, the processing unit 15 executes Step S509; otherwise, the processing unit 15 executes Step S511. The predefined acceleration threshold can be pre-configured in the processing unit 15 via firmware design according to the practical application requirement.

In Step S509, the processing unit 15 determines that the reference point 21 has not substantially moved among the first frame f1, the second frame f2, and the third frame f3. Whereas, in Step S511, the processing unit 15 determines that the reference has substantially moved among the first frame f1, the second frame f2, and the third frame f3 and the processing unit 15 does not update the first tilt angle currently used by the handheld pointer device 10.

Figure 7:
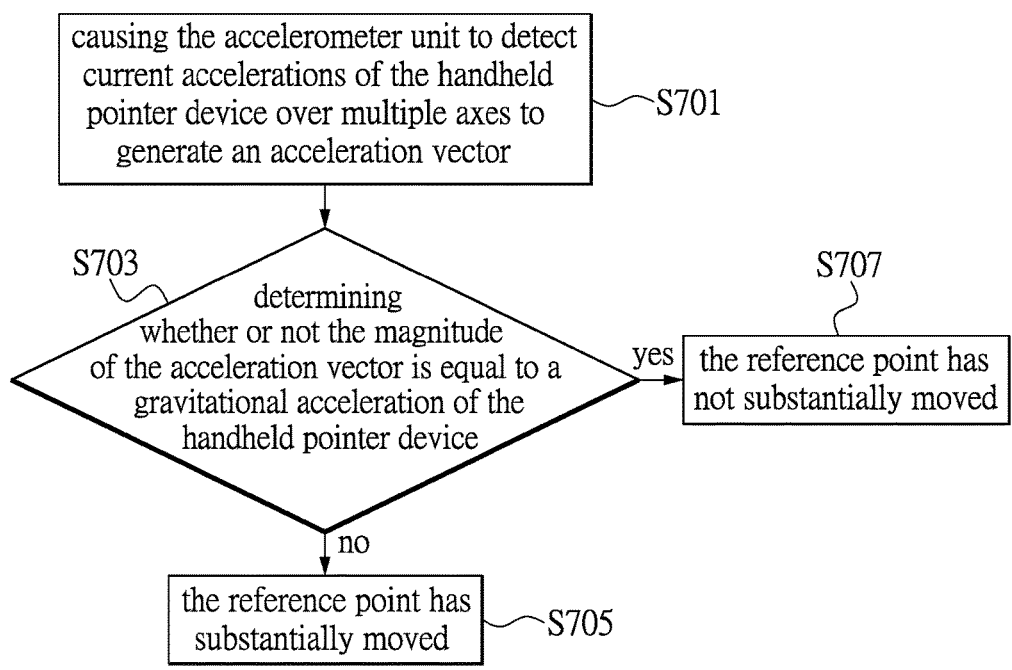
FIG. 7 is a flowchart diagram illustrating another method for determining whether the reference point has substantially moved provided in accordance to another exemplary embodiment of the present disclosure.

In still another embodiment, the processing unit 15 can determine whether or not the reference point 21 has substantially moved by detecting the variation in the acceleration of the handheld pointer device 10. Please refer to FIG. 7 in conjunction with FIG. 1 and FIG. 2, wherein FIG. 7 shows a flowchart diagram illustrating another method for determining whether the reference point 21 has substantially moved provided in accordance to another exemplary embodiment of the present disclosure.

In Step S701, the processing unit 15 of the handheld pointer device 10 causes the accelerometer unit 13 of the handheld pointer device 10 to detect the instant acceleration of the handheld pointer device 10 over multiple axes to generate an acceleration vector.

Next, in Step S703, the processing unit 15 of the handheld pointer device 10 determines whether the magnitude of the acceleration vector is equal to the gravitational acceleration of the handheld pointer device 10. Specifically, the processing unit 15 can determine whether the handheld pointer device 10 is at rest. For instance, the processing unit 15 can calculate the magnitude of the acceleration vector by taking the square root of each of the acceleration vector components squared. When the processing unit 15 determines that the acceleration vector of the handheld pointer device 10 is equal to the gravitational acceleration of the handheld pointer device 10, e.g., one gravitational unit (1 g), the processing unit 15 executes Step S707; otherwise, the processing unit 15 executes Step S705.

In Step S705, the handheld pointer device 10 determines that itself is in motion as the magnitude of the acceleration vector of the handheld pointer device 10 is not equal to the gravitational acceleration of the handheld pointer device 10, hence, the processing unit 15 determines that the reference point 21 has substantially moved, and does not update the first tilt angle currently used by the handheld pointer device 10. In Step S707, the magnitude of the acceleration vector of the handheld pointer device 10 is equal to the gravitational acceleration of the handheld pointer device 10 indicating that the handheld pointer device 10 is at rest. The processing unit 15 determines that the reference point 21 has not substantially moved.

Figure 4:
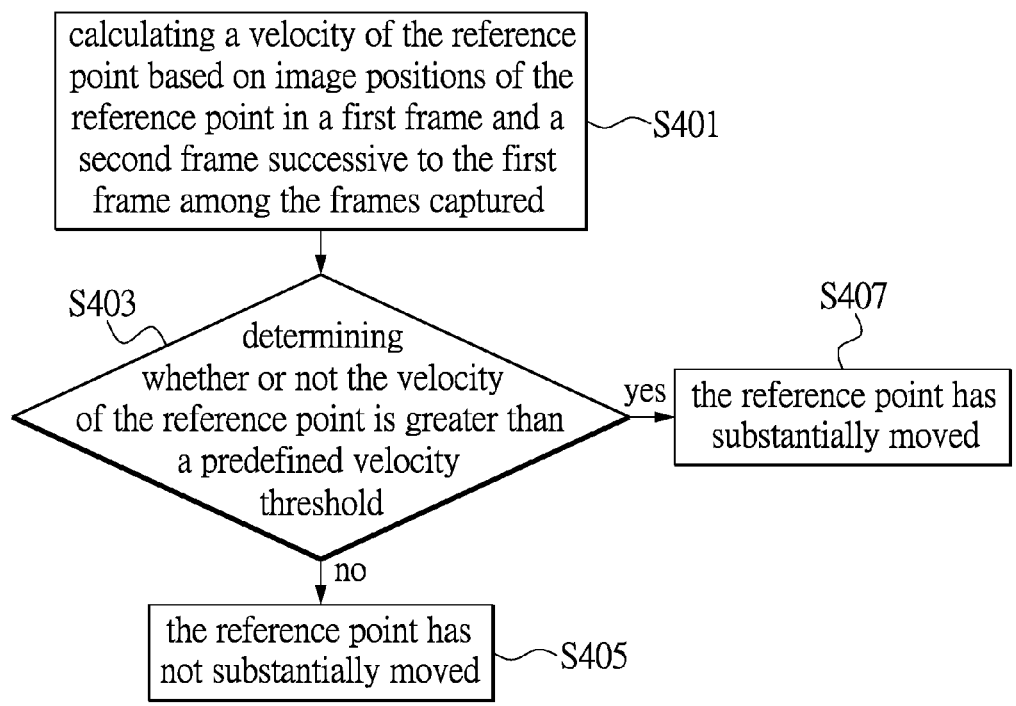
FIG. 4 is a flowchart diagram illustrating a method for determining whether the reference point has substantially moved provided in accordance to an exemplary embodiment of the present disclosure.

It worth noting that, in practice, the tilt angle adjustment method shown in FIG. 3 and methods for determining whether the reference point has substantially moved shown in FIG. 4, FIG. 5, and FIG. 7 can be implemented by writing necessary firmware into the processing unit 15 and executed by the processing unit 15 while the handheld pointer device 10 operates, however, the present disclosure is not limited thereto.

Figure 6A:
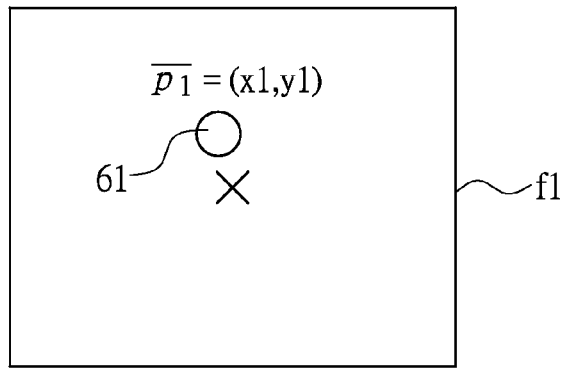
FIG. 6A-6C are schematic diagrams illustrating frames captured while the handheld pointer device is in motion provided in accordance to an exemplary embodiment of the present disclosure.
Figure 6B:
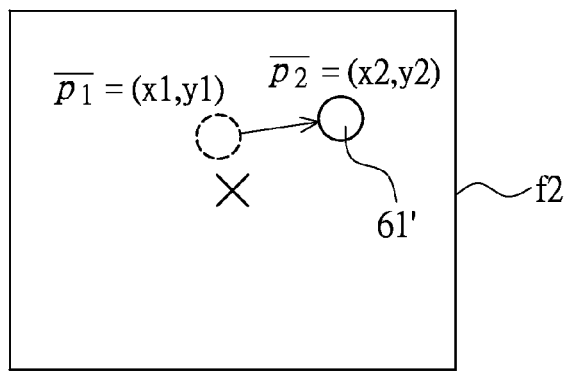
Figure 6C:
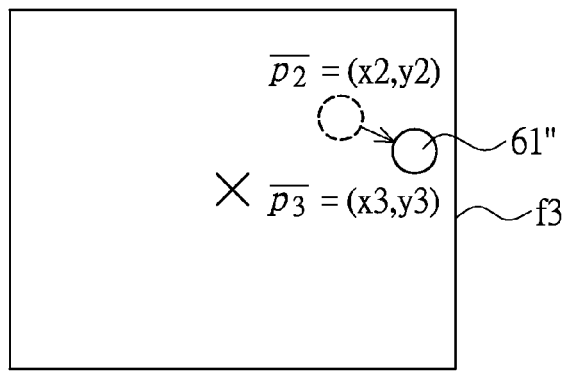

It shall be further noted that FIG. 3 is merely used to illustrate a tilt angle adjustment method of the handheld pointer device 10 and the present disclosure is not limited thereto. Similarly, FIG. 4, FIG. 5, and FIG. 7 are merely used to illustrate the method for determining whether or not the reference point has substantially moved, and the present disclosure is not limited thereto. As shown in FIG. 6A to 6C, the reference point image 61, 61', and 61" in the instant embodiment are denoted by circular dot for representing image positions of the reference point 21 in the first frame f1, the second frame f2, and the third frame f3. However, in practice, the reference point image 61, 61', and 61" may be represented in any form such as star, cross, triangle, or the like and the present disclosure is not limited to the examples provided herein. In other words, FIG. 6A~6C are only used in coordination with FIG. 4 and FIG. 5 for illustrating the method for calculating the velocity and the acceleration of the reference point 21 and the present disclosure is not limited thereto.

[Another Exemplary Embodiment of a Tilt Angle Adjustment Method]

From the aforementioned exemplary embodiments, the present disclosure can generalize another tilt angle adjustment method for the handheld pointer device of the aforementioned interactive system. The tilt angle adjustment method can determine whether to update the tilt angle current used by the handheld pointer device for pointing position calculation according to the velocity of the reference point, the acceleration of the reference point, and the acceleration of the handheld pointer device.

Figures 1, 8:
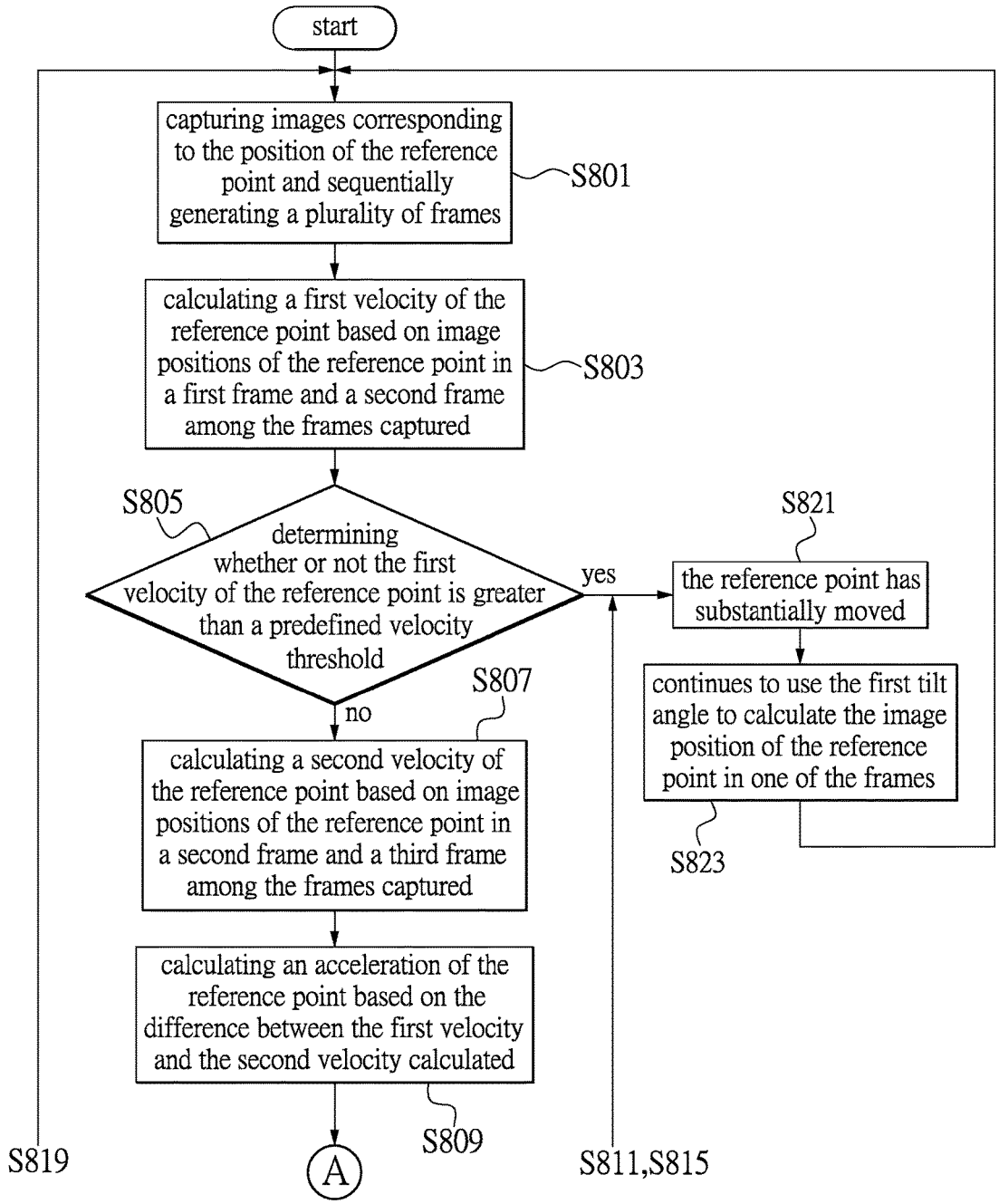
Figures 2, 8:
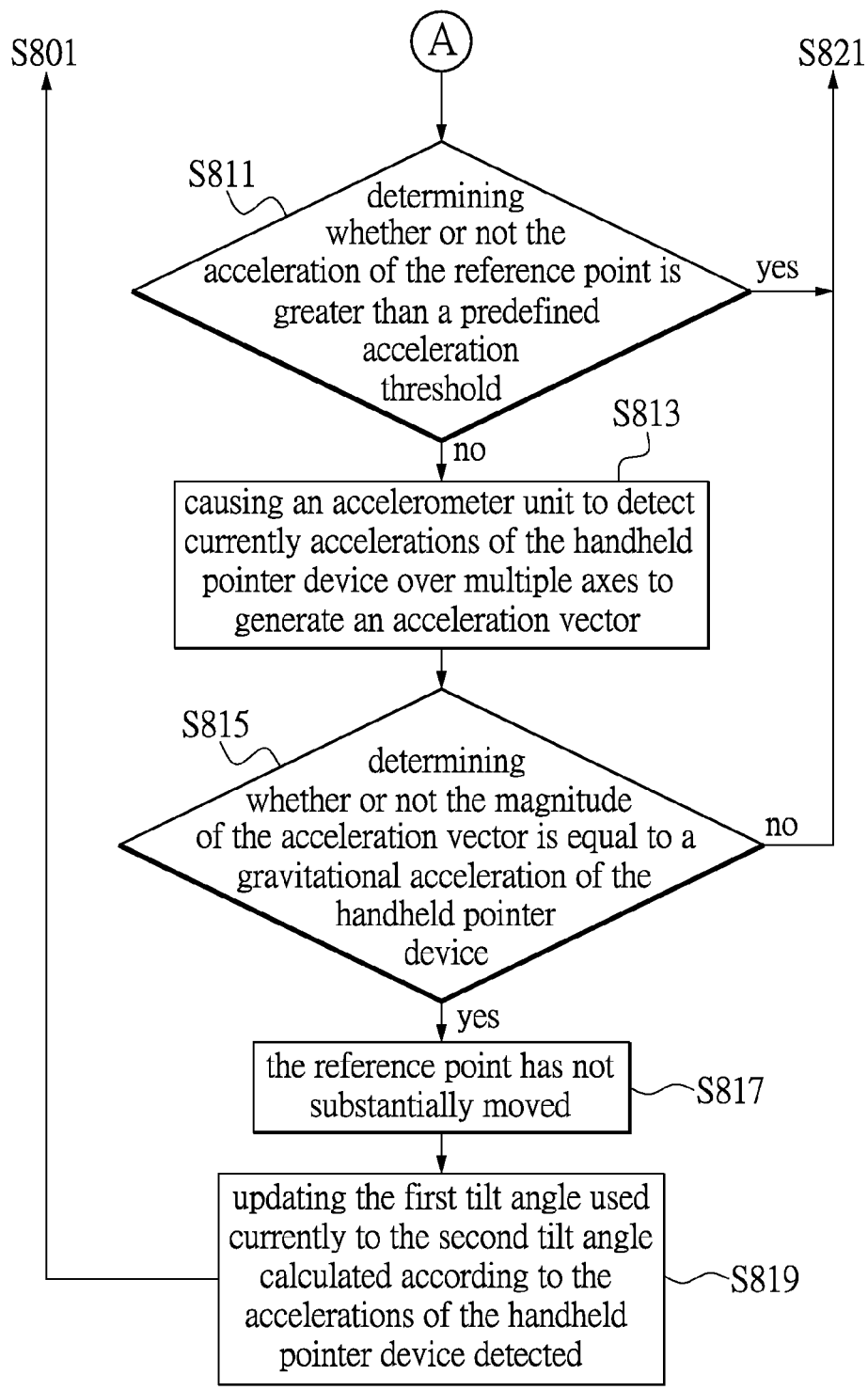

Please refer to the FIG. 8-1 and FIG. 8-2 in conjunction with FIGS. 1 and 2, wherein FIG. 8-1 and FIG. 8-2 are flowchart diagrams illustrating a tilt angle adjustment method of the aforementioned handheld pointer device provided in accordance to another exemplary embodiment of the present disclosure. The tilt angle adjustment method of the handheld pointer device illustrated in FIG. 8-1 and FIG. 8-2 can be implemented via firmware design and executed by the processing unit 15 of the handheld pointer device 10. The processing unit 15 can be implemented by a microcontroller or an embedded controller installed in the handheld pointer device 10, however, the present disclosure is not limited thereto.

In Step S801, the image capturing unit 11 of handheld pointer device 10 is driven to capture images corresponding to the position of the reference point 21 according to the predetermined image capturing frequency (e.g., 2000 frames per second) as the handheld pointer device 10 point toward the reference point 21 and sequentially generates a plurality of frames.

In Step S803, the processing unit 15 of the handheld pointer device 10 calculates the first velocity of the reference point 21 between the first frame and the second frame among the frames using equation (6).

In Step S805, the processing unit 15 determines whether the first velocity is larger than the predefined velocity threshold (e.g., one pixel per unit time). When the processing unit 15 determines that the first velocity is greater than the predefined velocity threshold, the processing unit 15 executes Step S821; otherwise, the processing unit 15 executes Step S807.

It worth noting that the unit time as previously described can be defined based on the image capturing frequency of the image capturing unit 11 (e.g., the unit time may be the time interval between two consecutive frames calculated according to the image capturing frequency), or the number of the consecutive frames analyzed (e.g., per every two consecutive frames).

In Step S807, the processing unit 15 calculates the second velocity of the reference point 21 between the second frame and the third frame among the frames using equation (7).

In Step S809, the processing unit 15 calculates the acceleration of the reference point 21 according to the first velocity and the second velocity. The processing unit 15 calculates the change in the velocity of the reference point 21 from the first frame to the third frame by calculating the difference between the first velocity and the second velocity.

Next, in Step S811, the processing unit 15 determines whether or not the acceleration is greater than the predefined acceleration threshold (e.g., 0 g). When the processing unit 15 determines that the acceleration is greater than the predefined acceleration threshold, the processing unit 15 executes Step S821; otherwise, the processing unit 15 executes Step S813.

In Step S813, the processing unit 15 of the handheld pointer device 10 causes the accelerometer unit 13 of the handheld pointer device 10 to detect accelerations of the handheld pointer device 10 over multiple axes to generate an acceleration vector. In Step S815, the processing unit 15 determines whether the magnitude of the acceleration vector is equal to the gravitational acceleration of the handheld pointer device 10, such as one gravitational unit, so as to determine whether the handheld pointer device 10 is at rest. Specifically, the processing unit 15 can calculate the magnitude of the acceleration vector by taking the square root of each of the acceleration vector component squared.

When the processing unit 15 determines that the magnitude of the acceleration vector is equal to the gravitational acceleration, the processing unit 15 executes Step S817; otherwise, the processing unit 15 executes Step S821.

In Step S817, the processing unit 15 determines that the reference point 21 has not substantially moved i.e., the handheld pointer device 10 is at rest. Subsequently, in Step S819, the processing unit 15 operatively calculates the second tilt angle using equations (1) to (3) and updates the first tilt angle currently used to the second tilt angle calculated. Thereafter, the processing unit 15 calculates the pointing coordinate or the movement information of the handheld pointer device 10 relative to the reference point 21 or the image display apparatus 30 according to the second tilt angle and one of the frames.

In Step S821, the processing unit 15 determines that the reference point 21 has substantially moved i.e., the handheld pointer device 10 is in motion. In Step S823, the processing unit 15 determines that the reference point 21 has substantially moved, and continues to use the first tilt angle of the handheld pointer device 10 for pointing position calculation. The processing unit 15 calculates the pointing coordinate or the movement information of the handheld pointer device 10 relative to the reference point 21 or the image display apparatus 30 according to the first tilt angle and one of the frames.

The processing unit 15 drives the transmission unit 17 to wirelessly transmit the pointing coordinate or the movement information to the host computer 20 so as to control the movement of the cursor 31 shown on the image display apparatus 30 in coordination with the software program being executed by the host computer 20.

The processing unit 15 returns to Step S801 after executing the steps S819 or S823 and executes steps of capturing images corresponding to the position of the reference point 21 and determining whether the reference point 21 has substantially moved to determine whether to update the first tilt angle currently used by the handheld pointer device 10 for pointing position calculation.

It shall be noted that FIG. 8-1 and FIG. 8-2 are only used to illustrate a tilt angle adjustment method of the handheld pointer device 10, and the present disclosure is not limited thereto. Those skilled in the art shall able to select the appropriate method for determining whether or not the reference point has substantially moved according to the practical application requirement. More specifically, Steps S803~S805 (i.e., steps for calculating the velocity of the reference point 21), Steps S807-S811 (i.e., steps for calculating the acceleration of the reference point 21), and Steps S813-S815 (i.e., steps for calculating the acceleration of the handheld pointer device 10) can be selectively executed or skipped depend upon the actual operational requirement.

Those skilled in the art can determine whether or not the reference point 21 has substantially moved by calculating the displacement of the reference point 21 before calculating the velocity of the reference point 21. More specifically, before executing Step S803, the processing unit 15 can first calculate the displacement of the image position of the reference point 21 between the first frame and the second frame. Then, the processing unit 15 determines whether or not the reference point 21 has substantially moved by determining whether the displacement is less than the predefined displacement threshold (e.g., 5 pixels per unit time) according to the displacement calculated.

Additionally, the predefined velocity threshold, the predefined acceleration threshold, and the predefined displacement threshold can be set described can be configured according to the practical application and operational requirements of the handheld pointer device 10 and the present disclosure is not limited to the example provided in the instant embodiment.

[Another Exemplary Embodiment of a Tilt Angle Adjustment Method]

From the aforementioned exemplary embodiments, the present disclosure can generalize another tilt angle adjustment method for the handheld pointer device of the aforementioned interactive system in the above mentioned embodiment. The tilt angle adjustment method can determine whether to update the tilt angle current used by the handheld pointer device for pointing position calculation according to the acceleration of the reference point.

Figure 9:
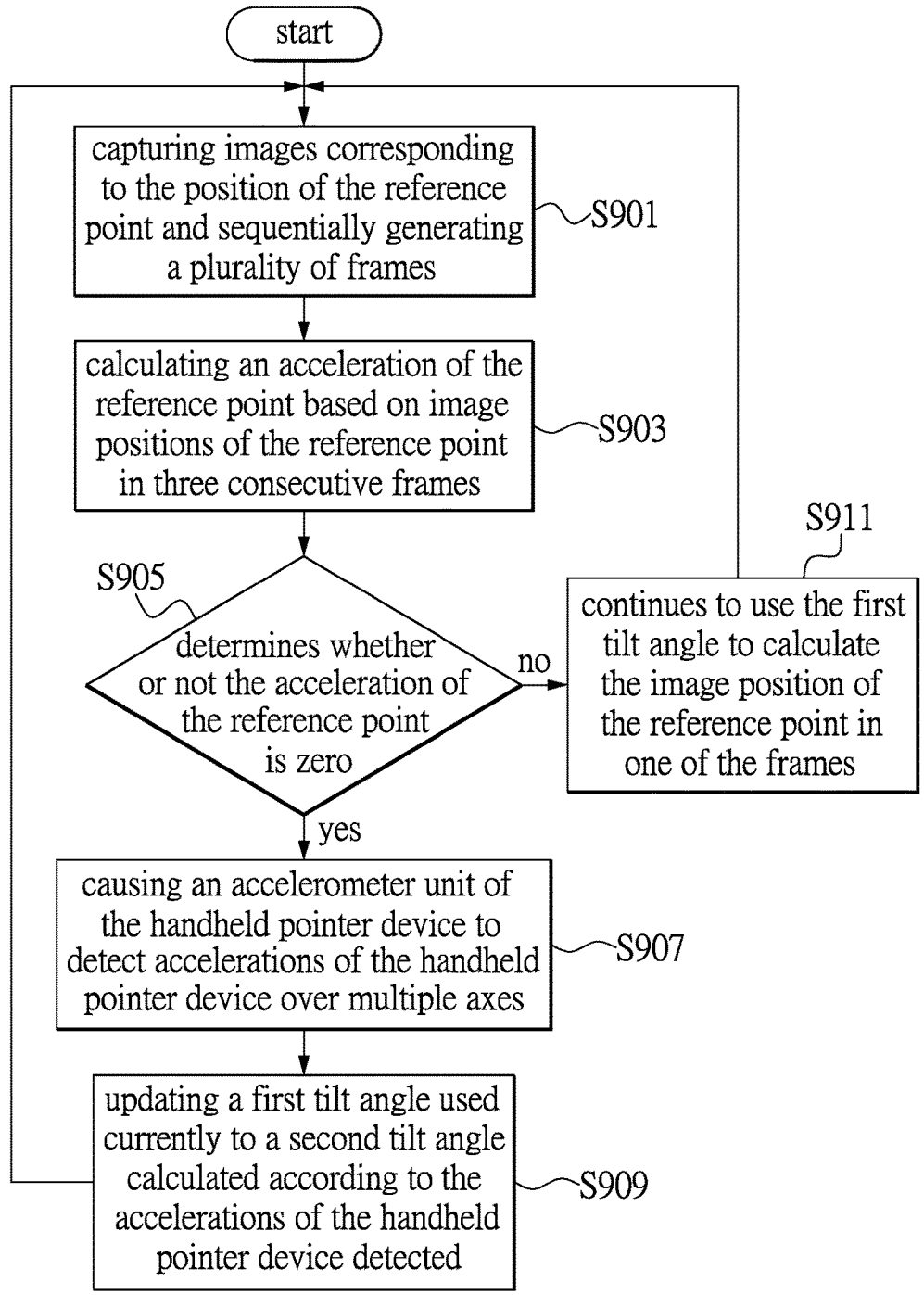
FIG. 9 is a flowchart diagram illustrating another tilt angle adjustment method of a handheld pointer device provided in accordance to another embodiment of the present disclosure.

Please refer to FIG. 9 in conjunction with FIG. 1, FIG. 2, and FIG. 6A to 6C. FIG. 9 shows a flowchart diagram illustrating a tilt angle adjustment method of the handheld pointer device provided in accordance to another exemplary embodiment of the present disclosure. The tilt angle adjustment method of the handheld pointer device 10 in FIG. 9 can be implemented via firmware design and executed by the processing unit 15. The processing unit 15 can be implemented by a processing chip, such as a microcontroller or an embedded controller, which is programmed with necessary firmware and installed inside the handheld pointer device 10 and the present disclosure is not limited thereto.

In Step S901, the image capturing unit 11 of the handheld pointer device 10 is driven to capture images corresponding to the position of the reference point 21 according to the predetermined image capturing frequency as the handheld pointer device 10 points toward the reference point and sequentially generates a plurality of frames.

In Step S903, the processing unit 15 of the handheld pointer device 10 calculates the acceleration of the reference point 21 according to the image positions of the reference point 21 formed in any three consecutive frames among the frames. In particular, among any three consecutive frames, the capturing time of the third frame f3 is later than the capturing time of the second frame f2 and the capturing time of the second frame f2 is later than the capturing time of the first frame f1.

More specifically, the processing unit 15 uses equation (6) to calculate the first velocity of the reference point 21 according to image positions of the reference point 21 formed in the first frame f1 and the second frame f2 i.e., the reference point images 61, 61' among the three consecutive frames. The processing unit 15 further uses equation (7) to calculate the second velocity of the reference point 21 according to image positions of the reference point 21 formed in the second frame f2 and the third frame f3 i.e., the reference point images 61', 61" among the three consecutive frames. Thereafter, the processing unit 15 calculates the acceleration of the reference point 21 according to the first velocity and the second velocity calculated.

In Step S905, the processing unit 15 determines whether the acceleration of the reference point 21 over three consecutive frames is equal to zero (i.e., 0 g) according to the image positions (i.e., the reference point images 61, 61' and 61") of the reference point 21 formed in three consecutive frames. When the processing unit 15 determines that the acceleration of the reference point 21 over three consecutive frames is equal to zero, the processing unit 15 executes Step S907; otherwise, the processing unit 15 executes Step S911.

In Step S907, when the processing unit 15 determines that the reference point 21 has not substantially moved, the processing unit 15 causes the accelerometer unit 13 of the handheld pointer device 10 to detect the instant acceleration of the handheld pointer device 10 over multiple axes and generate an acceleration vector. In Step S909, the processing unit 15 operatively calculates a second tilt angle and updates the first tilt angle currently used by the handheld pointer device 10 for pointing position calculation to the second tilt angle using equations (1) to (3). The processing unit 15 calculates the pointing coordinate or the movement information of the handheld pointer device 10 relative the reference point 21 or the image display apparatus 30 using the second tilt angle and one of the three consecutive frames.

In Step S911, when the processing unit 15 determines that the reference point 21 has substantially moved, the processing unit 15 does not update the first tilt angle. The processing unit 15 calculates the pointing coordinate or the relative movement information of the handheld pointer device 10 relative to the reference point 21 or the image display apparatus 30 using the first tilt angle and one of the three consecutive frames.

The processing unit 15 further control the transmission unit 17 to wirelessly transmit the pointing coordinate or the relative movement information of the handheld pointer device 10 to the host computer 20 to control the movement of the cursor 31 shown on the image display apparatus 30 in coordination with the execution of software program on the host computer 20.

The processing unit 15 returns to Step S901 after executed either Step S909 or Step S911 and execute steps of capturing the image positions of the reference point 21 and determining whether or not the reference point 21 has moved to determine whether to update the first tilt angle of the handheld pointer device 10.

It shall be noted that FIG. 9 is only used to illustrate a tilt angle adjustment method for the handheld pointer device 10 and the present disclosure is not limited thereto. Based on the above elaboration, those skilled in the art shall be able to freely insert steps of determining the displacement and the velocity of the reference point 21 for precisely determining whether or not the reference point 21 has moved depend upon practical operational requirement.

To sum up, the present disclosure provides a handheld pointer device and a tilt angle adjustment method thereof. The handheld pointer device and the tilt angle adjustment method can operatively calculate the changing in position of the reference point over time based on a reference point and an accelerometer and actively determining whether to cause the accelerometer to detect and generate acceleration information to calibrate the tilt angle of the handheld pointer device. The handheld pointer device can be programmed to operatively determine whether to update the tilt angle of the handheld pointer device based on whether of the handheld pointer device is in motion or at rest via firmware design. Particularly, the handheld pointer device can determine whether the itself is at rest or in motion by determining whether or not the reference point detected has substantially moved e.g., determining the velocity of the reference point, the acceleration of the reference point, and the accelerations of the handheld pointer device.

Accordingly, the handheld pointer device provided by the present disclosure is operable to accurately and effectively calculate the relative position of the reference point without having to install the gyroscope or use two or more reference points. Therefore, the overall hardware architecture of the handheld pointer device can be greatly simplified, thereby reduce the design and manufacturing cost associated with the handheld pointer device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A tilt angle adjustment method of a handheld pointer device, comprising:

capturing consecutively, by an image capturing unit of the handheld pointer device, images of only one light spot of a reference point as the handheld pointer device pointing toward a position of the reference point and generating a plurality of frames containing the image of the reference point, wherein the handheld pointer device is at a first tilt angle, the first tilt angle is used for pointing position calculation, and the image capturing unit includes only one sensor;

determining whether or not the reference point has substantially moved according to the frames so as to determine whether to update the first tilt angle currently used in calculating a pointing coordinate or a movement information of the handheld pointer device relative the reference point, wherein to determine whether the reference point has substantially moved is to determine whether image positions of the reference point in the frames have substantially moved, and the pointing coordinate or the movement information of the handheld pointer device relative the reference point is calculated based on the first tilt angle and one of the frames;

when determined that the reference point has not substantially moved, operatively causes an accelerometer unit of the handheld pointer device to detect the accelerations of the handheld pointer device over multiple axes and correspondingly update the first tilt angle currently used to a second tilt angle according to the accelerations of the point device detected, wherein the second tilt angle is calculated by a processing unit of the handheld pointer device using with the accelerations detected; and when determined that the reference point has substantially moved, continues to use the first tilt angle of the handheld pointer device for pointing position calculation.

2. The tilt angle adjustment method of claim 1, wherein the step of determining whether or not the reference point has substantially moved comprises:

calculating a position displacement between the image positions of the reference point in a first frame and a second frame successive to the first frame among the frames captured;

determining whether the position displacement of the reference point is less than a predefined displacement threshold; and when the position displacement of the reference point is less than the predefined displacement threshold, determines that the reference point has not substantially moved.

3. The tilt angle adjustment method of claim 1, wherein the step of determining whether or not the reference point has substantially moved comprises:

calculating a velocity of the reference point based on the image positions of the reference point in a first frame and a second frame successive to the first frame among the frames captured;

determining whether or not the velocity of the reference point is greater than a predefined velocity threshold; and when the velocity of the reference point is less than the predefined velocity threshold, determines that the reference point has not substantially moved.

4. The tilt angle adjustment method of claim 3, wherein the velocity of the reference point is calculated using the following equation:

$$v = \left| \frac{(\overline{p_2} - \overline{p_1})}{(t_{f2} - t_{f1})} \right|$$

wherein $v$ represents the velocity of the reference point; $\overline{p_2}$ represents the image position of the reference point in the second frame; $\overline{p_1}$ represents the image position of the reference point in the first frame; $t_{f2}$ represents the capturing time of the second frame; $t_{f1}$ represents the capturing time of the first frame.

5. The tilt angle adjustment method of claim 1, wherein the step of determining whether or not the reference point has substantially moved comprises:

calculating a first velocity of the reference point based on the image positions the reference point in a first frame and a second frame successive to the first frame among the frames captured;

calculating a second velocity of the reference point based on the image positions of the reference point in the second frame and a third frame successive to the second frame among the frames captured;

calculating an acceleration of the reference point based on the difference between the first velocity and the second velocity;

determining whether the acceleration of the reference point is greater than a predefined acceleration threshold; and when the acceleration of the reference point is less than the predefined acceleration threshold, determines that the reference point has not substantially moved.

6. The tilt angle adjustment method of claim 5, wherein the first velocity of the reference point is calculated using the following equation:

$$v_1 = \left| \frac{(\overline{p_2} - \overline{p_1})}{(t_{f2} - t_{f1})} \right|$$

wherein the $v_1$ represents the first velocity of the reference point; $\overline{p_2}$ represents the image position of the reference point in the second frame; $\overline{p_1}$ represents the image position of the reference point in the first frame; $t_{f2}$ represents the capturing time of the second frame; $t_{f1}$ represents the capturing time of the first frame;

wherein the second velocity of the reference point is calculated using the following equation:

$$v_2 = \left| \frac{(\overline{p_3} - \overline{p_2})}{(t_{f3} - t_{f2})} \right|$$

wherein $v_2$ represents the second velocity of the reference point; $\overline{p_3}$ represents the image position of the reference point in the third frame; $\overline{p_2}$ represents the image position of the reference point in the second frame; $t_{f3}$ represents the capturing time of the third frame; $t_{f2}$ represents the capturing time of the second frame.

7. The tilt angle adjustment method of claim 5, wherein the step of determining whether or not the reference point has substantially moved comprises:

causing the accelerometer unit to detect the accelerations of the handheld pointer device over multiple axes to generate an acceleration vector;

determining whether or not the magnitude of the acceleration vector is equal to a gravitational acceleration of the handheld pointer device; and when the magnitude of the acceleration vector is equal to the gravitational acceleration of the handheld pointer device, determines that the reference point has not substantially moved.

8. The tilt angle adjustment method of claim 1, wherein the step of determining whether or not the reference point has substantially moved comprises:

causing the accelerometer unit to detect the accelerations of the handheld pointer device over multiple axes to generate an acceleration vector;

determining whether or not the magnitude of the acceleration vector is equal to a gravitational acceleration of the handheld pointer device; and when the magnitude of the acceleration vector is equal to the gravitational acceleration of the handheld pointer device, determines that the reference point has not substantially moved.

9. A tilt angle adjustment method of a handheld pointer device, comprising:

capturing consecutively, by an image capturing unit of the handheld pointer device, images of only one light spot of a reference point as the handheld pointer device pointing toward a position of the reference point and generating a plurality of frames containing the image of the reference point, wherein the handheld pointer device is at a first tilt angle, the first tilt angle is used for pointing position calculation, and the image capturing unit includes only one sensor;
calculating an acceleration of the reference point based on image positions of the reference point in three consecutive frames;
determining whether the acceleration of the reference point is zero so as to determine whether to update the first tilt angle currently used in calculating a pointing coordinate or a movement information of the handheld pointer device relative the reference point, wherein the pointing coordinate or the movement information of the handheld pointer device relative the reference point is calculated based on the first tilt angle and one of the three consecutive frames; and
when determined that the acceleration of the reference point is zero, causes an accelerometer unit of the handheld pointer device to detect the accelerations of the handheld pointer device over multiple axes and correspondingly update the first tilt angle currently used to a second tilt angle calculated according to the accelerations of point device detected, wherein the second tilt angle is calculated by a processing unit of the handheld pointer device using with the accelerations detected;
wherein the step of calculating the acceleration of the reference point comprises:
calculating a first velocity of the reference point based on the image positions of the reference point in a first frame and a second frame among the three consecutive frames captured;
calculating a second velocity of the reference point based on the image positions of the reference point in the second frame and a third frame among the three consecutive frames captured;
calculating the acceleration of the reference point based on the difference between the first velocity and the second velocity.

10. The tilt angle adjustment method of claim 9, wherein the step after determined that the acceleration of the reference point is zero comprises:
causing the accelerometer unit to detect the accelerations of the handheld pointer device over the multiple axes of the handheld pointer device to generate an acceleration vector;
determining whether or not the magnitude of the acceleration vector is equal to a gravitational acceleration of the handheld pointer device; and
when determined that the magnitude of the acceleration vector of the reference point is equal to the gravitational acceleration of the handheld pointer device, correspondingly update the first tilt angle currently used to the second tilt angle calculated according to the accelerations of the handheld pointer device.

11. The tilt angle adjustment method of claim 9, wherein the first velocity of the reference point is calculated using the following equation:

$$v_1 = \left| \frac{(\overline{p_2} - \overline{p_1})}{(t_{f2} - t_{f1})} \right|$$

wherein the $v_1$ represents the first velocity of the reference point; $\overline{p_2}$ represents the image position of the reference point in the second frame; $\overline{p_1}$ represents the image position of the reference point in the first frame; $t_{f2}$ represents the capturing time of the second frame; $t_{f1}$ represents the capturing time of the first frame;
wherein the second velocity of the reference point is calculated using the following equation:

$$v_2 = \left| \frac{(\overline{p_3} - \overline{p_2})}{(t_{f3} - t_{f2})} \right|$$

wherein $v_2$ represents the second velocity of the reference point; $\overline{p_3}$ represents the image position of the reference point in the third frame; $\overline{p_2}$ represents the image position of the reference point in the second frame; $t_{f3}$ represents the capturing time of the third frame; $t_{f2}$ represents the capturing time of the second frame.

12. A handheld pointer device, comprising:
an image capturing unit, configured to consecutively capture images of only one light spot of a reference point as the handheld pointer device pointing toward a position of the reference point and sequentially generate a plurality of frames containing the image of the reference point, wherein the handheld pointer device is at a first tilt angle, the first tilt angle is used for pointing position calculation, and the image capturing unit includes only one sensor;
an accelerometer unit, configured to detect a plurality of accelerations of the handheld pointer device over multiple axes for generating an acceleration vector; and
a processing unit coupled to the image capturing unit and the accelerometer unit, configured to operatively determine whether or not the reference point has substantially moved according to the frames so as to determine whether to update the first tilt angle currently used in calculating a pointing coordinate or a movement information of the handheld pointer device relative the reference point, wherein to determine whether the reference point has substantially moved is to determine whether image positions of the reference point in the frames have substantially moved, and the pointing coordinate or the movement information of the handheld pointer device relative the reference point is calculated based on the first tilt angle and one of the frames;
wherein when the processing unit determines that the reference point has not substantially moved, the processing unit operatively causes the accelerometer unit to detect the accelerations of the handheld pointer device over multiple axes and correspondingly update the first tilt angle currently used to a second tilt angle calculated according to the accelerations of the handheld pointer device, wherein the second tilt angle is calculated by a processing unit of the handheld pointer device using with the accelerations detected;
wherein when determined that the reference point has substantially moved, continues to use the first tilt angle of the handheld pointer device for pointing position calculation.

13. The handheld pointer device of claim 12, wherein the processing unit calculates the position displacement between the image positions of the reference point in a first frame and a second frame among the frames captured to determine whether or not the image positions of the reference point has substantially moved in the first frame and the second frame according to the position displacement.

14. The handheld pointer device of claim 12, wherein the processing unit calculates a velocity of the reference point based on the image positions the reference point in a first frame and a second frame among the frames captured to determine whether or not the image position of the reference point has substantially moved in the first frame and the second frame according to the velocity of the reference point.

15. The handheld pointer device of claim 14, wherein the processing unit calculates the velocity of the reference point using the following equation:

$$v = \left| \frac{(\overline{p_2} - \overline{p_1})}{(t_{f2} - t_{f1})} \right|$$

wherein the v represents the velocity of the reference point; $\overline{p_2}$ represents the image position of the reference point in the second frame; $\overline{p_1}$ represents the image position of the reference point in the first frame; $t_{f2}$ represents the capturing time of the second frame; $t_{f1}$ represents the capturing time of the first frame.

16. The handheld pointer device of claim 12, wherein the processing unit calculates the image positions of the reference point in a first frame and a second frame among the three consecutive frames to generate a first velocity of the reference point, and the processing unit calculates the image positions of the reference point in the second frame and a third frame to generate a second velocity of the reference point;
wherein the processing unit calculates the difference between the first velocity and the second velocity to generate an acceleration of the reference point between the first frame and the third frame, the process unit determines whether or not the image position of the reference point has substantial moved according to the acceleration of the reference point.

17. The handheld pointer device of claim 16, wherein the processing unit calculates the first velocity of the reference point using the following equation:

$$v_1 = \left| \frac{(\overline{p_2} - \overline{p_1})}{(t_{f2} - t_{f1})} \right|$$

wherein the $v_1$ represents the first velocity of the reference point; $\overline{p_2}$ represents the image position of the reference point in the second frame; $\overline{p_1}$ represents the image position of the reference point in the first frame; $t_{f2}$ represents the capturing time of the second frame; $t_{f1}$ represents the capturing time of the first frame;
wherein the processing unit calculates the second velocity of the reference point using the following equation:

$$v_2 = \left| \frac{(\overline{p_3} - \overline{p_2})}{(t_{f3} - t_{f2})} \right|$$

wherein $v_2$ represents the second velocity of the reference point; $\overline{p_3}$ represents the image position of the reference point in the third frame; $\overline{p_2}$ represents the image position of the reference point in the second frame; $t_{f3}$ represents the capturing time of the third frame; $t_{f2}$ represents the capturing time of the second frame.

18. The handheld pointer device of claim 12, wherein the accelerometer unit is an accelerometer or a gravitational sensor.

19. A handheld pointer device comprising:
an image capturing unit, configured to consecutively capture images of only one light spot of a reference point as the handheld pointer device pointing toward a position of the reference point and sequentially generate a plurality of frames containing the image of the reference point, wherein the handheld pointer device is at a first tilt angle, the first tilt angle is used for pointing position calculation, and the image capturing unit includes only one sensor;
an accelerometer unit, configured to operatively detect a plurality of accelerations of the handheld pointer device over multiple axes for generating an acceleration vector; and
a processing unit coupled to the image capturing unit and the accelerometer unit, configured for operatively calculating an acceleration of the reference point based on the image positions of the reference point in three consecutive frames and determining whether the acceleration of the reference point is zero so as to determine whether to update the first tilt angle currently used in calculating a pointing coordinate or a movement information of the handheld pointer device relative the reference point, wherein the pointing coordinate or the movement information of the handheld pointer device relative the reference point is calculated based on the first tilt angle and one of the three consecutive frames;
wherein when the processing unit determines that the acceleration of the reference point is zero, the processing unit causes the accelerometer unit to detect the accelerations of the handheld pointer device over multiple axes and correspondingly updates the first tilt angle currently used to a second tilt angle calculated according to the accelerations of the handheld pointer device, wherein the second tilt angle is calculated by a processing unit of the handheld pointer device using with the accelerations detected;
wherein the processing unit calculates the image positions of the reference point in a first frame and a second frame among the three consecutive frames to generate a first velocity of the reference point, and the processing unit calculates the image positions of the reference point in the second frame and a third frame to generate a second velocity of the reference point;
wherein the processing unit calculates the difference between the first velocity and the second velocity to generate the acceleration of the reference point between the first frame and the third frame.

20. The handheld pointer device of claim 19, wherein when the processing unit determines that the acceleration of reference point is zero, the processing unit determines whether the magnitude of the acceleration vector is equal to a gravitational acceleration of the handheld pointer device and correspondingly updates the first tilt angle currently used to the second tilt angle calculated according to the accelerations of the handheld pointer device.

21. The handheld pointer device of claim 19, wherein the processing unit calculates the first velocity of the reference point using the following equation:

$$v_1 = \left| \frac{(\overline{p_2} - \overline{p_1})}{(t_{f2} - t_{f1})} \right|$$

wherein the $v_1$ represents the first velocity of the reference point; $\overline{p_2}$ represents the image position of the reference point in the second frame; $\overline{p_1}$ represents the image position of the reference point in the first frame; $t_{f2}$ represents the capturing time of the second frame; $t_{f1}$ represents the capturing time of the first frame;

wherein the processing unit calculates the second velocity of the reference point using the following equation:

$$v_2 = \left| \frac{(\overline{p_3} - \overline{p_2})}{(t_{f3} - t_{f2})} \right|$$

wherein $v_2$ represents the second velocity of the reference point; $\overline{p_3}$ represents the image position of the reference point in the third frame; $\overline{p_2}$ represents the image position of the reference point in the second frame; $t_{f3}$ represents the capturing time of the third frame; $t_{f2}$ represents the capturing time of the second frame.

22. The handheld pointer device of claim 19, wherein the accelerometer unit is an accelerometer or a gravitational sensor.

23. The handheld pointer device of claim 19, wherein when the processing unit determines that the acceleration of the reference point in the consecutive frames is greater than a predefined acceleration threshold, the processing unit does not update the first tilt angle of the handheld pointer device currently used and continues to use the first tilt angle to calculate the image position of the reference point in one of the frames.

24. A tilt angle adjustment method of a handheld pointer device, comprising:

capturing consecutively, by an image capturing unit of the handheld pointer device, images of only one light spot of a reference point as the handheld pointer device pointing toward a position of the reference point and generating a plurality of frames containing the image of the reference point, wherein the handheld pointer device is at a first tilt angle, the first tilt angle is used for pointing position calculation, and the image capturing unit includes only one sensor;

determining whether or not the reference point has substantially moved according to the frames so as to determine whether to update the first tilt angle currently used in calculating a pointing coordinate or a movement information of the handheld pointer device relative the reference point, wherein to determine whether the reference point has substantially moved is to determine whether image positions of the reference point in the frames have substantially moved, and the pointing coordinate or the movement information of the handheld pointer device relative the reference point is calculated based on the first tilt angle and one of the frames; and when determined that the reference point has substantially moved, continuing to use the first tilt angle of the handheld pointer device for pointing position calculation;

wherein the step of determining whether or not the reference point has substantially moved comprises:

calculating a first velocity of the reference point based on image positions the reference point in a first frame and a second frame successive to the first frame among the frames captured;

calculating a second velocity of the reference point based on the image positions of the reference point in the second frame and a third frame successive to the second frame among the frames captured;

calculating an acceleration of the reference point based on the difference between the first velocity and the second velocity;

determining whether the acceleration of the reference point is greater than a predefined acceleration threshold; and when the acceleration of the reference point is less than the predefined acceleration threshold, determining that the reference point has not substantially moved.

* * * * *